United States Patent [19]

Friedman et al.

[11] 4,211,647
[45] Jul. 8, 1980

[54] ANAEROBIC METHOD OF TREATING HIGH-STRENGTH WASTE-WATER

[76] Inventors: Alexander A. Friedman, 163 Brookside La., Fayetteville, N.Y. 13066; Scott J. Tait, B-14 Slocum Heights, Syracuse, N.Y. 13210

[21] Appl. No.: 11,097

[22] Filed: Feb. 12, 1979

[51] Int. Cl.$^2$ ............................. C02C 1/04; C02C 5/10
[52] U.S. Cl. ........................................... 210/17; 210/150
[58] Field of Search ...................... 210/2, 9, 12, 16, 17, 210/150, 151, 5, 3, DIG. 28, 218; 48/197 A

[56] References Cited

U.S. PATENT DOCUMENTS

| | | | |
|---|---|---|---|
| 3,640,846 | 2/1972 | Johnson | 210/2 |
| 3,817,857 | 6/1974 | Torpey | 210/16 |
| 4,067,801 | 1/1978 | Ishida et al. | 210/5 |
| 4,100,023 | 7/1978 | McDonald | 48/197 A |
| 4,134,830 | 1/1979 | Skogman et al. | 210/16 |

FOREIGN PATENT DOCUMENTS

| | | | |
|---|---|---|---|
| 2240188 | 3/1975 | France | 210/151 |
| 1401000 | 7/1975 | United Kingdom | 210/151 |

*Primary Examiner*—Benoît Castel
*Attorney, Agent, or Firm*—Bruns & Jenney

[57] ABSTRACT

Method for treating a fluid containing anaerobically digestible nutrients and organic substrates wherein a plurality of individual anaerobic microorganisms are established upon rotatable discs mounted within an enclosed housing and a stream of treatable fluid is passed through the housing to wet more than fifty percent of the disc surfaces. The discs are rotated through the fluid whereby the microorganisms are able to feed upon the nutrients and substrates in the fluid and expel a process gas into the atmosphere maintained over the fluid. To further enhance both the feeding of the microorganisms and the expulsion of gas, the housing is divided into a number of individual compartments or stages and the pressure is reduced below atmospheric pressure in each compartment.

5 Claims, 3 Drawing Figures

U.S. Patent
Jul. 8, 1980
4,211,647
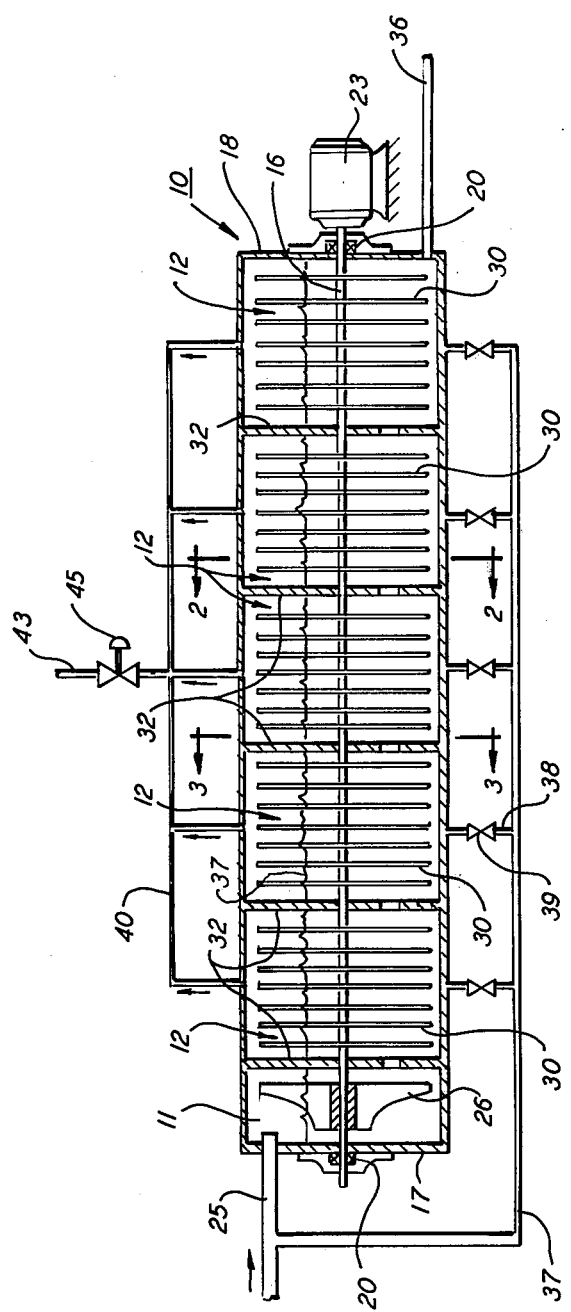
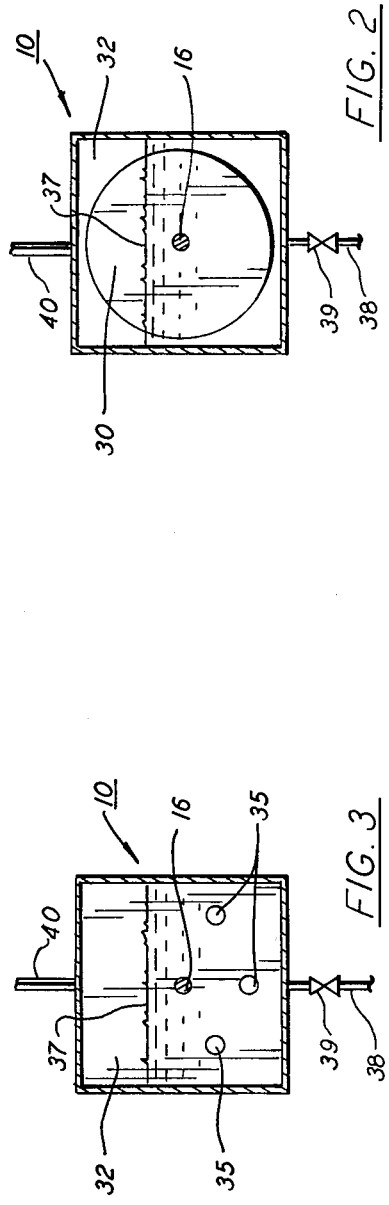

ANAEROBIC METHOD OF TREATING HIGH-STRENGTH WASTE-WATER

BACKGROUND OF THE INVENTION

This invention relates to an anaerobic treatment method for rapidly and effeciently treating a fluid containing anaerobic digestible nutrients and primarily organic substrates.

The most pertinent art known to the Applicants at the time of filing this application is embodied in the following United States Patents:

|           |           |
| --------- | --------- |
| 2,029,702 | 3,941,691 |
| 2,899,385 | 3,943,055 |
| 3,105,014 | 3,994,780 |
| 3,598,726 | 4,043,936 |
| 3,724,542 |           |

Heretofore most anaerobic treatment processes have been carried out in either relatively large holding tanks, lagoons or in packed columns. In either case, an anaerobic biomass is generally immersed within a fluid material that is being treated. These prior art devices thus operate under flooded conditions so that the microorganisms are forced to both feed and exhaust process gases while underwater. As a consequence, the microorganisms become highly saturated with process gases which are either inhibitory or toxic to the microorganisms and thus experience a relatively high resistance when they attempt to function in this environment. A natural resistance to efficient metabolism and substrate utilization is therefore inherently present in all flooded aerobic treatment systems which therefore inherently require relatively long mean cell detention times relative to anaerobic treatment. Even with retention periods of between 30 and 50 days the quality of the effluent is sometimes poor. Similarly, because of the typically low growth rate for most anaerobic microorganisms large volume holding or treatment tanks are required which necessitate large capital expenditures for both land and equipment. Oftentimes, because of the complexity of the equipment involved, operational difficulties are encountered which compound the existing time and money problems normally associated with many anaerobic processes.

SUMMARY OF THE INVENTION

It is therefore an object of the present invention to improve anaerobic treatment methods.

A further object of the present invention is to shorten the amount of time required to anaerobically treat high strength wastewaters.

A still further object of the present invention is to increase the efficiency of anaerobic treatment processes to provide for the production of high quality effluents.

Yet another object of the present invention is to overcome the natural gas transfer resistance present in most flooded anaerobic treatment systems.

Yet a still further object of the present invention is to provide a relatively inexpensive anaerobic treatment process.

These and other objects of the present invention are attained by passing a fluid containing anaerobically treatable nutrients and primarily organic substrates through an enclosed housing and alternatingly immersing anaerobic colonies into the fluid for a first period of time to permit the microorganisms to feed upon the nutrients and substrates in the fluid and then exposing the microorganisms to the closed atmosphere maintained above the fluid for a second period of time whereby the microorganisms can expel the process gas produced by anaerobic fermentation directly into the atmosphere thereby considerably reducing resistance to the natural anaerobic process.

BRIEF DESCRIPTION OF THE DRAWINGS

For a better understanding of these and other objects of the present invention reference is had to the following detailed description of the invention which is to be read in conjunction with the accompanying drawings, wherein:

FIG. 1 is a side elevation with portions broken away showing a rotating biological contactor for carrying out an anaerobic treatment process encompassing the present invention;

FIG. 2 is a section taken along lines 2—2 in FIG. 1 showing a shaft mounted disc for drawing an anaerobic biomass through an influent passing through the housing;

FIG. 3 is a section taken along lines 3—3 in FIG. 1 showing a baffle used to separate the housing into a number of individual stages.

DESCRIPTION OF THE INVENTION

The present invention basically involves an anaerobic process that is ideally well suited for treating concentrated organic wastewaters. However, as will become apparent from the disclosure below, the process and the apparatus used to carry out the process can be equally as well utilized in treating any type of fluid containing nutrients and/or substrates upon which anaerobic microorganisms may feed. The term anaerobic, as herein used, refers to the metabolism by a large variety of microorganisms of organic substrates and nutrients that are contained either in a fluid or an atmosphere that is devoid of free oxygen. Substrate materials may include but are not limited to carbohydrates, fats, proteins, alcohol and acids that are either soluble or insoluble in a fluid and which can exist alone or in combination with other substrates and/or nutrients. One application of further importance involves the production of process gases by bioconversion which can be used as raw materials in the production of fuels and fertilizers.

With reference to the drawings, the present process is carried out within an airtight and fluidtight housing that is generally referenced 10. The housing is partitioned into a number of individual compartments that include a mixing chamber 11 and a plurality of processing or treatment stages 12—12. In this particular embodiment of the invention there are five separate treatment stages. However, the number of stages may be varied without departing from the teachings of the present invention. In operation, influent is initially delivered into the mixing chamber and from there passed seriatim through each of the treatment stages.

A horizontally aligned drive shaft 16 is centrally positioned within the housing and is journalled for rotation in the two end walls 17, 18 via bearing 20—20. The right hand end of the shaft, as viewed in FIG. 1, passed through wall 18 and is coupled to a variable speed drive motor 23.

In operation, influent is delivered into the mixing chamber by means of an inlet line 25. An impellor wheel 26 is secured to the drive shaft within the chamber that functions to thoroughly blend or mix the constituents contained in the fluid. After mixing, the fluid is passed directly into the first treatment stage.

Each treatment stage contains a number of circular discs 30—30 that are uniformly spaced along the drive shaft. The discs are affixed in a vertical position upon the shaft so as to turn with the shaft as it is driven by motor 23. As will be explained in greater detail below, a colony of anaerobic microorganisms is established upon the surface of each disc. The discs, in operation, are partially submerged within the process fluid so that the colony is sequentially immersed in the fluid and then exposed to the atmosphere above the fluid. The biomass thus feeds upon the nutrients and substrates for a portion of each revolution and can expel process gases generated by bioconversion directly into the housing atmosphere. The rotating discs also provide added mixing of the process fluid and serve to strip gas from the fluid.

As best seen in FIG. 1, the mixing chamber and the treatment stages are separated by a series of baffles 32—32. As further shown in FIG. 3, each baffle contains a series of horizontal holes 35—35 for exchanging process fluid or wastewater between stages. The holes are located below the axial centerline of the shaft. The liquid level 37 in the housing, on the other hand, is maintained above the shaft bearings to wet about 70% of the surface area of each disc. The process fluid is thus used as a fluid seal to isolate the atmosphere in each stage from ambient air. An exhaust line 36 passes out of the last stage in the series through the end wall 18. The exhaust line is at a lower elevation than the inlet line whereby it can carry effluent from the housing under natural flow conditions.

In the anaerobic process, a relatively large amount of the food consumed by the organisms is converted to a process gas rather than going into cell mass. However, in most flooded anaerobic systems, where the biomass remains submerged in the process fluid, a built-in resistance is present which tends to slow down the bioconversion process. It is believed that when the process gases are discharged directly into the process fluid, the fluid first becomes saturated with gas before the gas can be released into the atmosphere. The effect of this fluid resistance in the flooded system is reflected in the long retention times required to bring the process to completion. Retention time of between 30 and 50 days are typical for unmixed systems and 10 to 20 day retention times for mixed systems.

In the present invention, retention periods which previously have been measured in days have been reduced to hours. This is achieved by providing a dynamic living environment for the biomass wherein anaeobic microorganisms can feed upon the wastewater for a prescribed period of time and, upon digestion of the food, are allowed to discharge the converted process gas directly into a controlled oxygen-free atmosphere. As should be evident from the present disclosure, by establishing colonies on the surfaces of the discs, the microorganisms in the colony are drawn through the wastewater for a portion of each shaft revolution and exposed to the anoxic atmosphere over the fluid for the remaining portion thereof. This creates a controlled feeding cycle within the system which overcomes much of the resistance encountered in a flooded system. This controlled feeding cycle is also believed to speed up the biomass digestive process thereby permitting each colony to perform relatively more work.

In many systems, the present invention will inherently control the pH within desired or optimum operating boundaries. Most anaerobic systems produce quantities of carbon dioxide, particularly when used to treat high strength industrial waste. If the gas is allowed to saturate the process fluid, carbonic acid can be formed, thereby driving down the pH of the effluent. By discharging the process gases directly into the atmosphere saturation of the process fluids with carbon dioxide is avoided and the pH of the fluid will remain generally stable.

Referring once again to FIG. 1, a gas discharge line 40 is connected to each of the treatment stages and is adapted to a single main outlet line 43 for carrying the gases out of the system. An automatic control valve 45 is operatively positioned in line 43 for regulating the flow of gas from the housing. A negative pressure, that is, a pressure somewhat below atmospheric pressure, may be maintained in the atmosphere over the fluid. Although not shown, a vacuum pump or any other suitable exhaust system attached to line 43 can be used to draw a negative pressure within the housing. By lowering the operating pressure of the system, resistance to the anaerobic process is further reduced and the speed and efficiency of the system is thus increased.

As noted, each treatment stage is isolated by means of the baffling arrangement whereby the concentration of nutrients and substrates contained in the wastewater is lowered in steps as the wastewater moves through the housing. Progressive lowering of the concentration gradient promotes good substrate removal while utilizing a minimal amount of space. To extend the operational capacity of the present apparatus under certain load conditions, an auxiliary influent delivery system is provided which is able to introduce raw influent independently into each of the treatment stages. A bypass line 37 is arranged to divert a portion of the influent from inlet line 25 and direct it below each of the treatment stages as shown in FIG. 1. The bypass line is connected into each stage via a feed line 38 that passes upwardly through the bottom wall of the stage. A control valve 39 is connected into each feed line. The valves can be adjusted to regulate the amount of raw influent that is introduced into each treatment stage. Although the auxiliary fluid is not premixed, the rotating discs contained in each stage will provide sufficient fluid mixing and gas stripping to effectively handle the added load.

The invention will now be explained in greater detail with reference to the following examples:

EXAMPLE 1

A synthetic wastewater was prepared containing sucrose ($C_{12}H_{22}O_{11}$) and the nutrients of nitrogen, phosphorus, magnesium, potassium, iron, cobalt, calcium, sodium and sulfur. Additional trace nutrients were supplied by adding tap water to the influent. Sodium bicarbonate was also added to provide a buffer for volatile acid formations and to maintain a pH in the system within a 6 to 8 range. The wastewater constituents were continually mixed and delivered to a treatment housing similar to that described above that was maintained in a control room at a temperature of about 35° C.

The treatment housing contained four uniform sized stages and a smaller size mixing chamber. All components were constructed of a clear plastic so that visual observations of the interior of the housing could be made. Eleven discs, each having a 5" diameter, were rotatably mounted upon a common shaft within each stage with about 70% of the total surface area of each disc being submerged in the process fluid. Drain ports were provided in each stage through which fluid samples could be drawn. Gas produced in each stage was collected and passed through a wet test gas meter.

At start-up, the housing was seeded with about a one liter mixture of biomass water containing organic and inorganic material taken from effluents of existing anaerobic treatment systems. The biomass was fed a mixture of methanol and sucrose. Seed was periodically added to the system when the color of the fluid changed from a healthy black to a lighter brownish color. Microorganisms found in the effluent were pumped back into the stages in varying amounts. After about 27 days, colonies of microorganisms were observed growing on the discs and start-up was deemed completed. Synthetic wastewater, prepared as noted above, was pumped through the housing at varying rates and the results noted.

A total organic carbon (TOC) analysis was performed upon liquid samples of both the influent and effluent as well as samples drawn from each of the four treatment stages. All samples were passed through a 0.45 μm membrane filter. The process gases were collected and the percent methane and carbon dioxide contained therein were recorded. Alkalinity, pH and volatile acids were measured and recorded in the effluent, influent and fluid samples drawn from each stage. Alkalinity was based upon the amount of equivalent calcium carbonate present in each sample. The amount of solids present in the effluent were also determined and recorded using a Reeve Angel type 934A filter. Additional data collected included the total amount of solids present as well as total volatile solids, total filterable solids and total volatile filterable solids. Readings were taken for various flow rates, while holding the shaft speed constant. The results are tabulated in the following tables where e represents final effluent values.

| Fluid Flow = 0.30 l/hr. | | | |
| --- | --- | --- | --- |
| Sample | TOC mg/l | pH | Alkalinity mg/l CaCO$_3$ |
| Influent | 1050 | ≅7 | — |
| Stage 1 | 192 | 7.12 | 1680 |
| Stage 2 | 110 | 7.27 | 1680 |
| Stage 3 | 44 | 7.32 | 1810 |
| Stage 4 | 44 | 7.80 | 1750 |
| Effluent | 32 | 8.17 | 1680 |

RPM = 12
TS$_e$ = 2990 mg/l
TVS$_e$ = 940 mg/l
TFS$_e$ = 340 mg/l
VFS$_e$ = 290 mg/l
Gas Flow = 0.63 l/hr.
% CH$_4$ of Gas ≅ 50%
% CO$_2$ of Gas ≅ 50%
Temp = 35° C.

| Fluid Flow = 0.60 l/hr. | | | |
| --- | --- | --- | --- |
| Sample | TOC mg/l | pH | Alkalinity mg/l CaCO$_3$ |
| Influent | 1050 | ≅7 | — |
| Stage 1 | 345 | 7.20 | 1560 |
| Stage 2 | 262 | 7.37 | 1590 |
| Stage 3 | 130 | 7.50 | 1440 |
| Stage 4 | 55 | 7.80 | 1280 |
| Effluent | 53 | 8.01 | 1590 |

RPM = 12
TS$_e$ = 2910 mg/l
TVS$_e$ = 815 mg/l
TFS$_e$ = 480 mg/l
VFS$_e$ = 345 mg/l
Gas Flow = 1.1 l/hr.
% CH$_4$ of Gas ≅ 50%
% CO$_2$ of Gas ≅ 50%
Temp = 35° C.

| Fluid Flow = 1.20 l/hr. | | | |
| --- | --- | --- | --- |
| Sample | TOC mg/l | pH | Alkalinity mg/l CaCO$_3$ |
| Influent | 1102 | ≅7 | — |
| Stage 1 | 812 | 6.34 | 1123 |
| Stage 2 | 573 | 6.29 | 1298 |
| Stage 3 | 474 | 6.56 | 1373 |
| Stage 4 | 326 | 6.64 | 1435 |
| Effluent | 229 | 6.45 | 1123 |

RPM = 12
TS$_e$ = 2960 mg/l
TVS$_e$ = 1010 mg/l
TFS$_e$ = 220 mg/l
VFS$_e$ = 220 mg/l
Gas Flow = 1.6 l/hr.
% CH$_4$ of Gas ≅ 50%
% CO$_2$ of Gas ≅ 50%
Temp = 35° C.

| Fluid Flow = 2.40 l/hr. | | | |
| --- | --- | --- | --- |
| Sample | TOC mg/l | pH | Alkalinity mg/l CaCO$_3$ |
| Influent | 1102 | ≅7 | — |
| Stage 1 | 858 | 6.36 | 1190 |
| Stage 2 | 700 | 6.30 | 1250 |
| Stage 3 | 696 | 6.15 | 1120 |
| Stage 4 | 597 | 6.24 | 1250 |
| Effluent | 532 | 6.82 | 1590 |

RPM = 12
TS$_e$ = 3200 mg/l
TVS$_e$ = 1300 mg/l
TFS$_e$ = 300 mg/l
VFS$_e$ = 300 mg/l
Gas Flow = 2.9 l/hr.
% CH$_4$ of Gas ≅ 50%
% CO$_2$ of Gas ≅ 50%
Temp = 35° C.

The results set forth in the above-noted tables indicate that a high percentage of substrate and nutrients are removed from the influent in a relatively short period of time and that the volume of usable gas produced increases as the loading rate increases.

EXAMPLE 2

A synthetic organic wastewater slurry was manufactured to test the system's ability to produce both methane and carbon dioxide from many plentiful waste materials such as agricultural, industrial, municipal and domestic wastewaters as well as wastewater treatment plant sludges and other organic plant and animal waste materials. Basically the feed stock used sucrose as the primary constituent.

The treatment housing was set up as noted in Example 1 and the amount of gas produced for a regulated influent flow was recorded. The results are as follows:

| Sample | Fluid Flow = 0.30 l/hr. | | |
|---|---|---|---|
| | TOC mg/l | pH | Alkalinity mg/l $CaCO_3$ |
| Influent | 2320 | ≅7 | — |
| Stage 1 | 628 | 7.07 | 3410 |
| Stage 2 | 391 | 7.27 | 3410 |
| Stage 3 | 162 | 7.45 | 3480 |
| Stage 4 | 68 | 7.42 | 3320 |
| Effluent | 56 | 7.99 | 3410 |

RPM = 12
$TS_e$ = 5210 mg/l
$TVS_e$ = 1490 mg/l
$TFS_e$ = 450 mg/l
$VFS_e$ = 450 mg/l
Gas Flow = 1.3 l/hr.
% $CH_4$ of Gas ≅ 50%
% $CO_2$ of Gas ≅ 50%
Temp = 35° C.

| Sample | Fluid Flow = 0.60 l/hr. | | |
|---|---|---|---|
| | TOC mg/l | pH | Alkalinity mg/l $CaCO_3$ |
| Influent | 2320 | ≅7 | — |
| Stage 1 | 1233 | 6.90 | 3000 |
| Stage 2 | 777 | 7.08 | 3350 |
| Stage 3 | 749 | 7.27 | 3320 |
| Stage 4 | 498 | 7.24 | 3350 |
| Effluent | 454 | 7.55 | 3450 |

RPM = 12
$TS_e$ = 5630 mg/l
$TVS_e$ = 2190 mg/l
$TFS_e$ = 560 mg/l
$VFS_e$ = 560 mg/l
Gas Flow = 2.1 l/hr.
% $CH_4$ of Gas ≅ 50%
% $CO_2$ of Gas ≅ 50%
Temp = 35° C.

As can be seen, as the flow rate of wastewater through the system increases the amount of bioconverted gas also increases. These tests were conducted at a constant shaft speed under atmospheric conditions. Increasingly the shaft speed, while decreasing the housing pressure, will further increase the rate of gas production.

While this invention has been described with reference to the method disclosed above, it is not confined to the details as set forth and this application is intended to cover any modifications or changes that may come within the scope of the following claims.

We claim:

1. The process of treating a high strength wastewater containing anaerobic digestible nutrients and organic substrates including the steps of
   rotatably supporting a plurality of contactors within an enclosed airtight housing upon a common shaft that passes horizontally through the housing,
   partitioning the housing into separate horizontally aligned treatment stages, each of which contains a number of contactors therein,
   passing a stream of high strength wastewater in series through each of the stages to partially wet each of said contactors,
   mixing the influent prior to its entering the first stage in the series,
   establising a colony of anaerobic organisms upon each of the contactors for feeding upon the nutrients and organic substrates contained in the wastewater to produce methane and carbon dioxide gases,
   creating an anoxic atmosphere over the wastewater contained in the housing,
   rotating said shaft at a predetermined rate to immerse the organisms into the wastewater for a first period of time wherein the organisms feed upon said nutrients and said organic substrates and to expose the organisms to the atmosphere over the fluid for a second period of time to permit the organisms to release the process gases into said atmosphere in response to the digestion of said nutrients and organic substrates.

2. The process of claim 1 further including the step of drawing a vacuum in the atmosphere over the fluid contained within the housing.

3. The process of claim 1 that further includes the step of metering untreated wastewater into each of the stages to maintain each stage at an optimum operating level.

4. The process of claim 1 that further includes the step of connecting each of the stages in fluid flow communication below the liquid level maintained within the housing.

5. The process of claim 4 that further includes the step of wetting about 70% of the surface area of the contactors in said wastewater.

* * * * *